(12) United States Patent
Wade et al.

(10) Patent No.: US 11,530,169 B1
(45) Date of Patent: Dec. 20, 2022

(54) FERTILIZER MICROBE COMBINATION

(71) Applicant: Bio-Soil Enhancers, Inc., Hattiesburg, MS (US)

(72) Inventors: Nolan Wayne Wade, Moselle, MS (US); Janiece McWilliams, Moselle, MS (US); Charles Grantham, Ovett, MS (US); H. Randall Smith, Ovette, MS (US); Louis H. Elwell, III, Holmdel, NJ (US)

(73) Assignee: Bio-Soil Enhancers, Inc., Hattiesburg, MS (US)

( * ) Notice: Subject to any disclaimer, the term of this patent is extended or adjusted under 35 U.S.C. 154(b) by 0 days.

(21) Appl. No.: 17/830,260

(22) Filed: Jun. 1, 2022

Related U.S. Application Data

(63) Continuation-in-part of application No. 17/496,720, filed on Oct. 7, 2021, now abandoned.

(51) Int. Cl.
*C05F 11/08* (2006.01)
*C05F 11/02* (2006.01)

(52) U.S. Cl.
CPC .............. *C05F 11/08* (2013.01); *C05F 11/02* (2013.01)

(58) Field of Classification Search
None
See application file for complete search history.

(56) References Cited

U.S. PATENT DOCUMENTS

| | | | |
|---|---|---|---|
| 6,471,741 B1 | 10/2002 | Reinbergen | |
| 2003/0220200 A1 | 11/2003 | Wertz et al. | |
| 2005/0039509 A1 | 2/2005 | Muma | |
| 2012/0083412 A1 | 4/2012 | Trevino et al. | |
| 2016/0073641 A1 | 3/2016 | Allen et al. | |
| 2016/0200637 A1 | 7/2016 | Jacobson et al. | |
| 2016/0289130 A1 | 10/2016 | Innes et al. | |
| 2018/0230507 A1 | 8/2018 | Kerovuo et al. | |
| 2019/0029267 A1 | 1/2019 | Greenshields et al. | |
| 2019/0037853 A1 | 2/2019 | Stark et al. | |
| 2019/0124917 A1 | 5/2019 | Bobeck | |
| 2020/0148605 A1 | 5/2020 | Burnham et al. | |
| 2021/0267214 A1 | 9/2021 | Farmer et al. | |
| 2021/0276927 A1 | 9/2021 | Di Muzio et al. | |
| 2021/0329826 A1 | 10/2021 | Basler et al. | |
| 2021/0400963 A1* | 12/2021 | Farmer | A23K 20/163 |
| 2022/0015390 A1* | 1/2022 | Farmer | A23K 20/142 |
| 2022/0030878 A1* | 2/2022 | Zorner | A01G 20/00 |
| 2022/0132842 A1* | 5/2022 | Bussmann | C05G 5/23 504/100 |
| 2022/0132864 A1* | 5/2022 | Zorner | A23K 10/37 504/117 |

OTHER PUBLICATIONS

United States Patent And Trademark Office Non-Final Office Action regarding U.S. Appl. No. 17/496,720 in related mater; 10 pages.

* cited by examiner

*Primary Examiner* — Wayne A Langel

(74) *Attorney, Agent, or Firm* — Jeffrey G. Sheldon; Cislo & Thomas LLP

(57) ABSTRACT

A plant nutrient composition comprises both fertilizer and microorganisms bound together so that the advantages of fertilizer and microorganisms for plant growth and soil health can be obtained by a one-step administration of the plant nutrient composition.

22 Claims, No Drawings

FERTILIZER MICROBE COMBINATION

CROSS-REFERENCE

This utility patent application is a continuation-in-part of U.S. patent application Ser. No. 17/496,720 filed on Oct. 7, 2021 entitled, "Fertilizer Microbe Combination", the contents of which are incorporated by reference herein in its entirety.

BACKGROUND

Two types of plant nutrient compositions are microorganisms, often combined with humate, and fertilizer particles, generally containing one or more of these nutrients: nitrogen, phosphorus, and potassium. An example of a microorganism containing composition is SumaGrow™ formulation comprising microbes suspended in a humate carrier.

One or both of these can be used. Even though these compositions are desirable to maximize plant growth and yield, they can often be costly and time consuming to apply when applying separately. A challenge is the unavailability of a single composition containing both fertilizer particles and microorganisms. Therefore, when individual compositions are applied separately, equipment and labor costs required for such applications increases thereby reducing Return on Investment (ROI).

Accordingly, it would be desirable to have a plant nutrient composition containing both microorganisms and fertilizer particles so that both can be applied in a single application, maximizing ROI.

SUMMARY

Accordingly, the present invention is directed to a method of preparing such a plant nutrient composition and the composition itself. A method of preparing the plant nutrient composition comprises the step of mixing together:
 (a) fertilizer;
 (b) a non-ionic surfactant ("NIS");
 (c) microorganisms in a microorganism formula;
 (d) (i) an anionic polymer, (ii) a linear polysaccharide, (iii) humate, (iv) the humate and the anionic polymer, or (v) the humate and the linear polysaccharide, and
 (e) water,
 thereby forming a plant nutrient composition.

The fertilizer can be a liquid. The fertilizer can comprise particles comprising at least one of nitrogen, phosphorus, potassium, sulfur, calcium, and magnesium.

Preferably when the fertilizer comprises nitrogen the humate is included. The humate can be in a liquid form. The amount of dry humate is 0.2 to 10 kg per ton of fertilizer.

A urease inhibitor can be used in an amount of from about 0.5 to 20 liters per ton of the fertilizer.

About 5 to about 64 liters of microorganism formula per ton of the fertilizer can be used, wherein the microorganism formula comprises about $1 \times 10^2$ to about $1 \times 10^{10}$ CFU of microorganisms per ml of microorganism formula.

The amount of NIS is about 0.1 to about 5 ml/L of water.

The amount of anionic polymer or linear polysaccharide is about 0.1 to about 1% weight per 8 liters of water.

The method can comprise:
 i) combining (a) and (b) to form a first mixture;
 ii) combining (c) and (d) to form a second mixture before or after step (i); and
 iii) coating at least some of the fertilizer with the second mixture.

The invention also includes the composition prepared. For example, a plant nutrient composition can comprise:
 (a) a first mixture comprising fertilizer and a first binder; and
 (b) a second mixture comprising (i) microorganisms and (ii) a second binder; wherein at least some of the microorganisms are bound to the fertilizer by the first and second binders.

The first binder can comprise the NIS and also the urease inhibitor. The second binder can comprise (i) the humate, (ii) the anionic polymer, (iii) the linear polysaccharide, (iv) the humate and the anionic polymer, or (v) the humate and the linear polysaccharide.

A preferred plant nutrient composition comprises:
 (a) water;
 (b) a first mixture comprising fertilizer and a first binder comprising at least one of a NIS and a urease inhibitor, wherein the fertilizer comprises particles comprising nitrogen, phosphorus, and potassium, wherein the amount of NIS is about 0.1 to about 5 ml/L of water used;
 (c) a second mixture comprising microbe formula and any one or combination of (i) humates, and (ii) a second binder comprising of an anionic polymer or linear polysaccharide;
  wherein the second mixture comprises about 5 to about 64 liters of microorganism formula per ton of the fertilizer;
  wherein the microorganism formula comprises about $1 \times 10^2$ to about $1 \times 10^{10}$ CFU of microorganisms per ml of microorganism formula;
  wherein at least some of the microorganisms are bound to the fertilizer by the first and second binders; and
  wherein the amount of NIS is about 0.1 to about 5 ml/L of the water used

DESCRIPTION

The present invention comprises a plant nutrient composition and a method of preparing the plant nutrient composition comprising the step of mixing together:
 fertilizer;
 a NIS;
 microorganisms in a microorganism formula;
 (i) an anionic polymer, or (ii) a linear polysaccharide, or (iii) humate, or (iv) humate and the anionic polymer, or (v) humate and the linear polysaccharide; and
 water,
 thereby forming a plant nutrient composition. The humate can be dry or in a liquid.

The fertilizer typically comprises particles comprising at least one of the following: nitrogen, phosphorous, and potassium, or any combination of two, or all three. For example, a 15-13-20 fertilizer contains 15% by weight of nitrogen, and similar percentages by weight, 13% by weight phosphorous as $P_2O_5$, 20% potassium as $K_2O$, and the remainder inert ingredients. A fertilizer that contains only one macro-nutrient has "0" in other values. For example, if a fertilizer is 10-0-0, then it only contains nitrogen. Fertilizer can contain micronutrients and/or sulfur. The fertilizer can also contain additional nutrients such as calcium and manganese, among others. The fertilizer can also be in a liquid form.

NIS helps fertilizer particles spread and adhere microorganisms to fertilizer particles, also referred to as granules. Preferably the fertilizer granules are combined with a urease inhibitor for preventing nitrogen from volatizing into the atmosphere or leaching into non-target sites. The combination of fertilizer, NIS, and optionally urease inhibitor, is referred to as a first mixture.

A second mixture comprises (i) microorganisms, (ii) optionally humates, and/or (iii) anionic polymer or linear polysaccharide.

Optionally, plant nutrient composition comprises micronutrients for plant growth such as boron, manganese, zinc, and iron. Micronutrients can be included in first mixture and/or the second mixture.

Exemplary microorganisms are *Bacillus, Azaspirillum, Azarhizobium, Sinorhizobium, Bradyrhizobium, Ensifer, Mesorhizobium, Gliocladium, Trichoderma,* and/or *Pseudomonas.*

Examples of NIS's are Drexel Surf-Ac820™, TweenT™ (ethoxylated (or polyoxyethylene) derivatives of sorbitan esters), Triton™ such as Triton X.-100™ (a NIS with formula t-Oct—$C_6H_4$—$(OCH_2CH_2)_x(OH, x=9-10)$, and Brij series surfactants (derived by ethoxylating naturally sourced primary fatty alcohols).

Exemplary suitable urease inhibitors are Instinct NXT-GEN® nitrogen stabilizer, Agrotain™ available from Koch Agronomic Services, N-(n-Butyl) thiophosphoric triamide (NBTPT or NBPT), phenylphosphorodiamidate (PPD/PPDA), and hydroquinone.

Exemplary anionic polymers are carboxy methyl guar gum (CMG) and sodium alginate.

Exemplary linear polysaccharides are methylcellulose, gum Arabic, and alginate

An important feature of this invention is that the non-ionic surfactants and urease inhibitors can serve as a first binder and the humate and the non-ionic polymer and linear polysaccharide can serve as a second binder. The combination of the first binder and the second binder serves to protect and bind microorganisms to the fertilizer granules or particles.

A typical amount of each component is:
(a) water in an amount of about 1 to about 5, more preferably about 2 to about 4, and most preferably about 2, liters of water per ton of fertilizer;
(b) NIS in an amount of about 0.1 to about 5 ml/L of the water, preferably about 0.25 to about 2.5 ml/L (the water in the component of (a) typically is used with the NIS);
(c) urease inhibitor is about 0.5 to about 20, preferably about 0.9 to about 9.5, liters per ton of the fertilizer;
(d) about 5 to about 64, preferably about 8 to about 32, liters of microorganism formula per ton of the fertilizer, wherein the microorganism formula comprises about $1\times10^2$ to about $1\times10^{10}$ CFU of microorganisms per ml of microorganism formula ("CFU" is colony forming units);
(e) humates is about 0.2 to about 10, preferably about 0.5 to about 8, kg dry humates per ton of fertilizer (the humates can be introduced as a liquid formula); and
(f) anionic polymer or linear polysaccharide is about 0.1 to 1% (w/v) per 8 liters of water.

A NIS content of less than about 0.1 ml/L of water is generally not effective. More NIS than about 5 ml/L of water adds to cost without a significant increase in effectiveness.

A microorganism content of less than about 5 liters of microorganism formula per ton of the fertilizer is typically insufficient for plant nutrition effectiveness when applied to soil or plans, and over about 64 liters of microorganism formula per ton of the fertilizer adds to the cost without a significant increase in effectiveness.

An anionic polymer or linear polysaccharide content of less than 0.1% (w/v) per 8 liters of water can be ineffective, and more than 1% (w/v) per 8 liters of water adds to the cost without significantly increasing effectiveness.

A humates content of less than about 0.2 kg dry humates per ton of fertilizer can be ineffective, and more than about 10 kg dry humates per ton of fertilizer adds to the cost without a commensurate increase in effectiveness.

EXAMPLE (PROSPECTIVE)

The following is performed at ambient temperature and pressure.

To form a first mixture, two thousand (2,000) pounds of dry fertilizer containing at least one of nitrogen, phosphorus, or potassium or any combination of more than one of 0-46 nitrogen, 0-46 phosphorus, and 0-64 potassium (at least one of the nutrients is greater than 0) are placed into an industrial mixer. As the dry fertilizer is rotating in the mixer, a NIS and/or urease inhibitor, such as Agrotain™, is added at the rate of 7.6 liters per ton of dry fertilizer. Prior to blending of the primary nutrients, additional nutrients can be optionally added, such as boron (B), manganese (Mn), zinc (Zn), and/or iron (Fe) at the rate of about 0.6 kg per 907.2 kg (ton) of fertilizer for each nutrient. Mixing is continued while adding an 80/20 or 90/10 NIS and/or urease inhibitor at the rate described as above per ton of fertilizer.

After all ingredients are added to the mixer, the ingredients are tumbled at fifteen (15) revolutions per minute (RPM) for approximately four (4) minutes to ensure an even coating, and then are allowed to stand for two (2) minutes to thoroughly dry.

To form a second mixture, in a separate container, a microbial consortium consisting of one or more of the following genera with a concentration of the microbes of $1\times10^2$ CFU/ml to $1\times10^{10}$ CFU/ml: *Bacillus, Azaspirillum, Azorhizobium, Sinorhizobium, Bradyrhizobium, Ensifer, Mesorhizobium, Gliocladium, Trichoderma,* and/or *Pseudomonas* is used. The genera chosen is suspended in 5 to 10 liters of either liquid humates, anionic polymer, or linear polysaccharide solution. Powdered humates containing humic acid and/or fulvic acid can be used if liquid humates are not used in the microorganism formula.

In the industrial mixer, while tumbling the first mixture at fifteen RPM, the second mixture is added to the first mixture and tumbled for an additional four (4) minutes to mix thoroughly. The resulting combination is allowed to stand for two (2) minutes to dry and then packaged.

The finalized, packaged plant nutrient composition is then applied to crops and fields per the farmer's fertilizer requirements.

Although the present invention has been described in considerable detail with regard to certain preferred versions thereof, other versions are possible. For example, the invention is useful with fertilizer particles containing any from one to all three of potassium, nitrogen, and phosphorous as well as containing other compounds or micronutrients, or can be a specialty fertilizer such as magnesium and/or calcium. Also, fertilizer particles can be treated with a liquid solution containing other constituents, like what has been listed previously, or can be a liquid fertilizer. Therefore the overall scope of the present invention should not be limited to just N:P:K, but all other nutrients commonly used in fertilizers..

The reader's attention is directed to all papers and documents which are filed concurrently with this specification and which are open to public inspection with the specification, and the contents of all such papers and documents are incorporated herein by reference.

All the features disclosed in the specification including any accompanying claims, and abstract, may be replaced by alternate features serving the same and/or equivalent purpose unless expressly stated otherwise. Thus, unless expressly stated otherwise, each feature disclosed is one example only of a generic series of equivalent for similar features.

What is claimed is:

1. A method of making a fertilizer and microbe composition, the method comprising the steps of:
   (a) combining fertilizer and a non-ionic surfactant in the presence of water and mixing the combination to form a first mixture;
   (b) allowing the first mixture to dry;
   (c) preparing a second mixture by suspending microbes in at least one of the following: liquid humates, anionic polymer or linear polysaccharide; and
   (d) after step (b) adding the second mixture to the first mixture so that microbes are bound to the fertilizer, forming the composition.

2. The method of claim 1 wherein the amount of non-ionic surfactant is about 0.1 to about 5 ml/L of water.

3. The method of claim 2 wherein the amount of non-ionic surfactant is about 0.25 to about 2.5 ml/L of water.

4. The method of claim 1 wherein step a) comprises mixing in a urease inhibitor.

5. The method of claim 4 wherein the amount of urease inhibitor is from about 0.5 to about 20 liters per ton of the fertilizer.

6. The method of claim 5 wherein the amount of urease inhibitor is from about 0.95 to about 9.5 liters per ton of the fertilizer.

7. The method of claim 1 comprising about 5 to about 64 liters of microbe composition per ton of the fertilizer, wherein the microbe composition comprises about $1\times10^2$ to about $1\times10^{10}$ CFU of microorganisms per ml of microbe composition.

8. The method of claim 7 comprising about 8 to about 32 liters of microbe composition per ton of the fertilizer.

9. The method of claim 1 wherein the amount of anionic polymer or linear polysaccharide is about 0.1 to about 1% weight per 8 liters of water.

10. The method of claim 1 wherein the amount of humates is about 0.2 to about 10 kg per ton of fertilizer.

11. The method of claim 10 wherein the amount of humates is about 0.5 to about 8 kg per ton of fertilizer.

12. The method of claim 1, further comprising step e) allowing the composition to dry so that the composition is suitable to be applied for plant growth.

13. The composition prepared by the method of claim 1.

14. A composition comprising:
   a) fertilizer;
   b) about 1 to about 5 liters of water per ton of composition;
   c) NIS in an amount of about 0.1 to about 5 mL/liter of water;
   d) about 0.5 to about 20 liters of urease inhibitor per ton of fertilizer;
   e) about 5 to about 64 liters of microbe composition per ton of fertilizer, wherein the microbe composition comprises about $1\times10^2$ to about $1\times10^{10}$ CFU of microorganisms per ml of microbe composition;
   f) about 0.2 to about 10 kg of dry humate per ton of fertilizer; and
   g) about 0.1 to about 1% weight/volume of anionic polymer or linear polysaccharide per 8 liters of water; wherein the microbes are bound to the fertilizer.

15. The composition of claim 14, wherein the composition comprises:
   a) about 2 to about 4 liters of water per ton of composition;
   b) about 0.25 to about 2.5 mL/L of NIS;
   c) about 0.9 to about 9.5 liters of urease inhibitor per ton of fertilizer;
   d) about 8 to about 32 liters of microbiome composition per ton of fertilizer;
   e) about 0.5 to about 8 kg of dry humate per ton of fertilizer.

16. A composition comprising:
   a) fertilizer;
   b) about 1 to about 5 liters of water per ton of composition;
   c) NIS in an amount of about 0.1 to about 5 mL/liter of water;
   d) about 0.5 to about 20 liters of urease inhibitor per ton of fertilizer;
   e) about 5 to about 64 liters of microbe composition per ton of fertilizer, wherein the microbe composition comprises about $1\times10^2$ to about $1\times10^{10}$ CFU of microorganisms per ml of microbe composition; and
   f) about 0.2 to about 10 kg of dry humate per ton of fertilizer;
   wherein the microbes are bound to the fertilizer.

17. The composition of claim 16, further comprising about 0.1 to about 1% weight/volume of anionic polymer per 8 liters of water.

18. The composition of claim 16, further comprising about 0.1 to about 1% weight/volume of linear polysaccharide per 8 liters of water.

19. A composition comprising:
   a) fertilizer;
   b) about 1 to about 5 liters of water per ton of composition;
   c) NIS in an amount of about 0.1 to about 5 mL/liter of water;
   d) about 0.5 to about 20 liters of urease inhibitor per ton of fertilizer;
   e) about 5 to about 64 liters of microbe composition per ton of fertilizer, wherein the microbe composition comprises about $1\times10^2$ to about $1\times10^{10}$ CFU of microorganisms per ml of microbe composition; and
   f) about 0.1 to about 1% weight/volume of anionic polymer per 8 liters of water;
   wherein the microbes are bound to the fertilizer.

20. The composition of claim 19, further comprising about 0.2 to about 10 kg of dry humate per ton of fertilizer.

21. A composition comprising:
   a) fertilizer;
   b) about 1 to about 5 liters of water per ton of composition;
   c) NIS in an amount of about 0.1 to about 5 mL/liter of water;
   d) about 0.5 to about 20 liters of urease inhibitor per ton of fertilizer;
   e) about 5 to about 64 liters of microbe composition per ton of fertilizer, wherein the microbe composition comprises about $1\times10^2$ to about $1\times10^{10}$ CFU of microorganisms per ml of microbe composition; and
   f) about 0.1 to about 1% weight/volume of linear polysaccharide per 8 liters of water;
   wherein the microbes are bound to the fertilizer.

22. The composition of claim 21, further comprising about 0.2 to about 10 kg of dry humate per ton of fertilizer.

\* \* \* \* \*